United States Patent [19]
Smith et al.

[11] 3,872,283
[45] Mar. 18, 1975

[54] VEHICLE IDENTIFICATION METHOD AND APPARATUS

[75] Inventors: Gerald R. Smith; Oscar Jerome Brittingham, III, both of Atlanta, Ga.

[73] Assignee: The Cadre Corporation, Atlanta, Ga.

[22] Filed: July 13, 1973

[21] Appl. No.: 378,988

[52] U.S. Cl. ............................ 235/150.2, 340/31 R
[51] Int. Cl. ...................... G06f 15/50, G08g 1/015
[58] Field of Search....... 235/150.22, 150.2, 150.23, 235/150.24, 150.27; 340/22, 23, 24, 25, 26, 27 NA, 27 R, 27 SS, 31 R, 38 R; 343/5 LS, 5 GC

[56] References Cited
UNITED STATES PATENTS

| | | | |
|---|---|---|---|
| 3,274,547 | 9/1966 | Bolton | 235/150.24 X |
| 3,290,489 | 12/1966 | Auer, Jr. | 235/150.24 |
| 3,406,395 | 10/1968 | Zupanick | 235/150.24 X |
| 3,794,966 | 2/1974 | Platzman | 340/31 R |

*Primary Examiner*—Joseph F. Ruggiero
*Attorney, Agent, or Firm*—Jones, Thomas & Askew

[57] ABSTRACT

Identification of vehicle types, such as types of aircraft, by identifying unique characteristics of the "footprint" presented by the configuration of wheels unique to a particular type of vehicle. Movement of the vehicle through a gate produces time-related signals which are a function of the vehicle velocity and of the configuration of wheels on the vehicle. Velocity of the vehicle is determined, and the velocity is used along with the time information to compute the relative position of each vehicle wheel, and also to provide footprint dimension data which can be compared with the dimension data of known types of vehicles for identification purposes.

14 Claims, 7 Drawing Figures

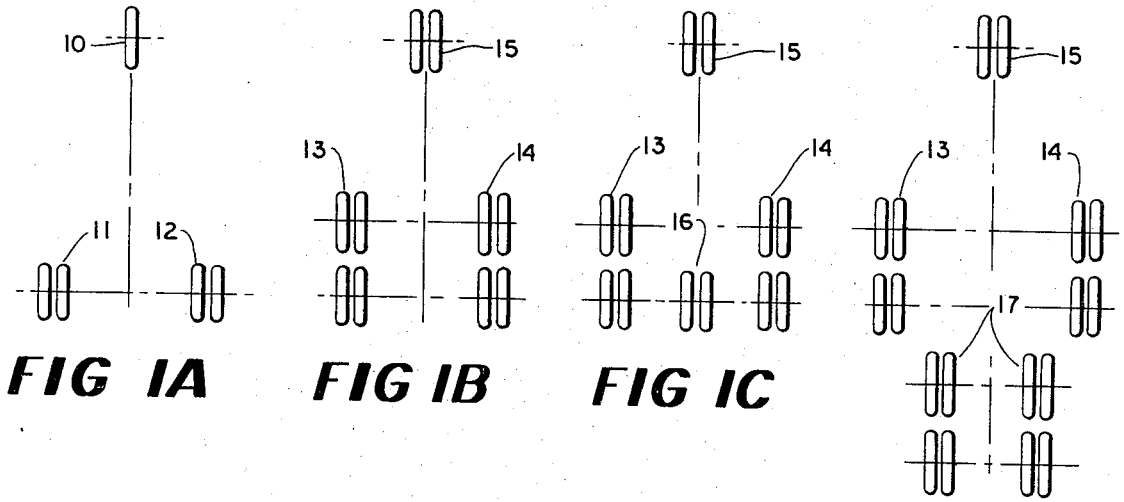
FIG IA FIG IB FIG IC FIG ID
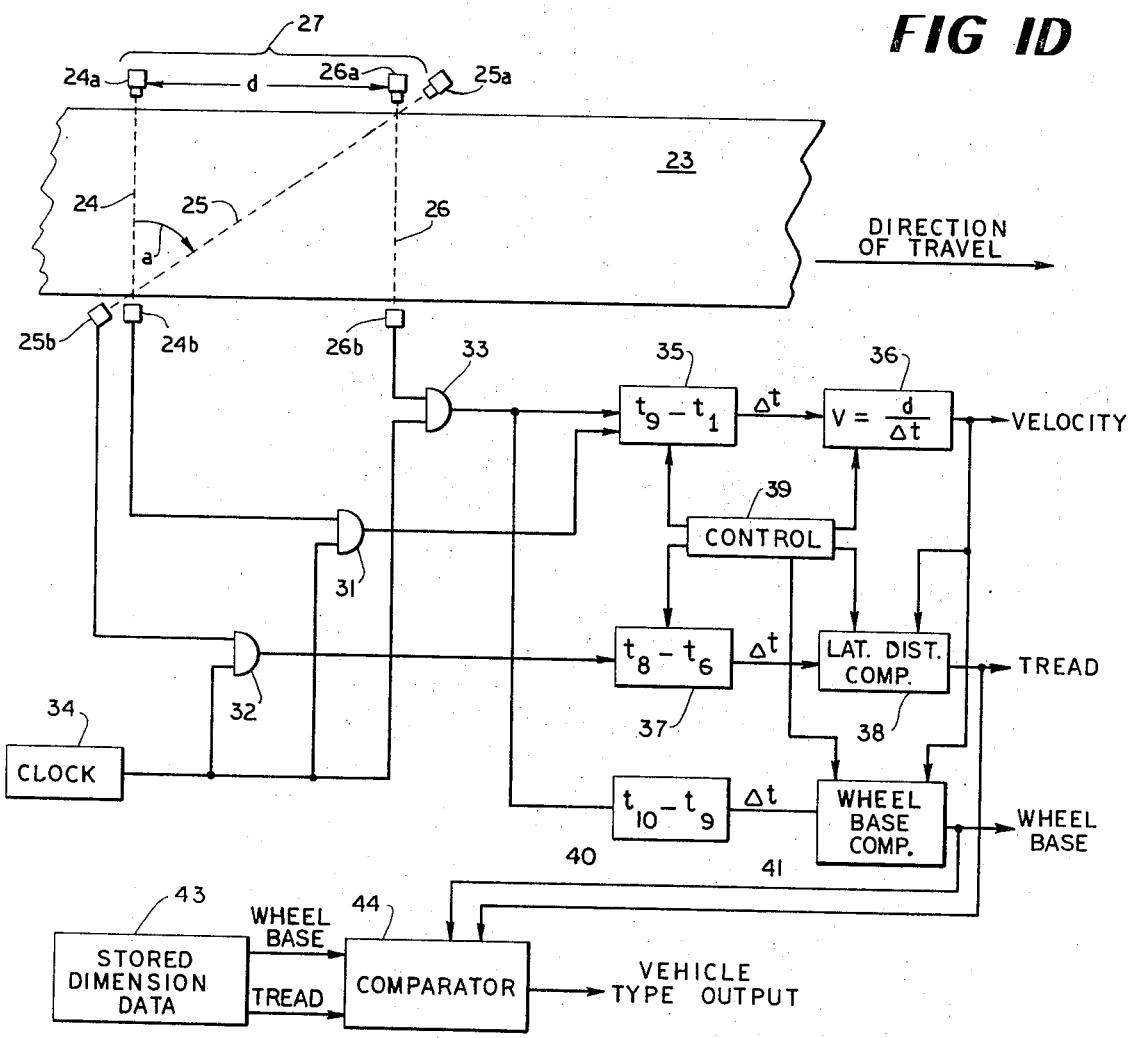
FIG 2

VEHICLE IDENTIFICATION METHOD AND APPARATUS

This invention relates in general to vehicle identification and in particular to a system for identifying types of vehicles.

The constant growth of air transportation has seen a corresponding increase in the numbers and types of aircraft utilized in commercial and non-commercial air transportation. These types of aircraft have a wide range of size and weight, among other characteristics, and it is known to those skilled in the art that the various aircraft types have correspondingly different take-off and landing characteristics. For example, a relatively large and fully-loaded aircraft may be expected to require a substantial portion of a 10,000 ft. runway for a normal take-off, whereas a smaller aircraft might normally be expected to utilize no more than half of that runway length.

It has been proposed to monitor the speed and acceleration of an aircarft on the runway during take-off and landing, so that it would be instanteneously known whether an aircraft had accelerated (or decelerated) to a particular critical speed for take-off (or safe landing roll-out). As applied to on-board equipment, such techniques and devices would naturally require pilot attention to preset the exact runway length into a computer or similar apparatus before each use. With respect to such measurements made on the ground with respect to a particular runway, moreover, it will be apparent that any measurement and computation is meaningful only if the aircraft type is immediately known, inasmuch as a given speed attained during a take-off run at a certain point along the length of a runway may be satisfactory for one type of aircraft and may indicate the need for an aborted take-off with another type of aircraft.

While ground-based equipment could be designed and constructed to receive aircraft type information through manual data input, such input enhances the possibility of operator error arising either from misidentification of an aircraft or from faulty entry of the data into the system. Furthermore, many modern commercial airports handle a large and continuous volume of traffic and the control tower personnel at such airports do not need to be burdened with yet another duty to be manually performed for each and every landing and take-off.

Still another need for vehicle type identification arises in connection with aircraft and other vehicles on the various taxiways of an airport, since such information can be appropriately displayed or otherwise utilized to control the ground movement of such vehicles.

It is apparent from the foregoing and from other requirements that the need exists for some way in which the type of an aircraft can be passively identified, that is, without requiring information actively transmitted from the aircraft, in an automatic manner not requiring manual input from an operator.

Accordingly, it is an object of the present invention to provide an improved method and apparatus for identification of vehicles.

It is another object of the present invention to provide improved method and apparatus for identifying the type of vehicles such as an aircraft.

It is still another object of the present invention to identify the type of a vehicle by evaluating certain vehicular characteristics and by comparing these characteristics with the corresponding characteristics of known types of vehicles.

It is a further object of the present invention to determine various dimensional characteristics of a moving vehicle.

Other objects and many of the attendant advantages of the present invention will become more readily apparent from the following description of an embodiment thereof, including the drawing in which:

FIG. 1 shows plan views of several typical types of different footprints corresponding to various types of aircraft presently in service;

FIG. 2 shows a schematic view of a vehicle identification system according to the disclosed embodiment of the present invention;

Figure 3:
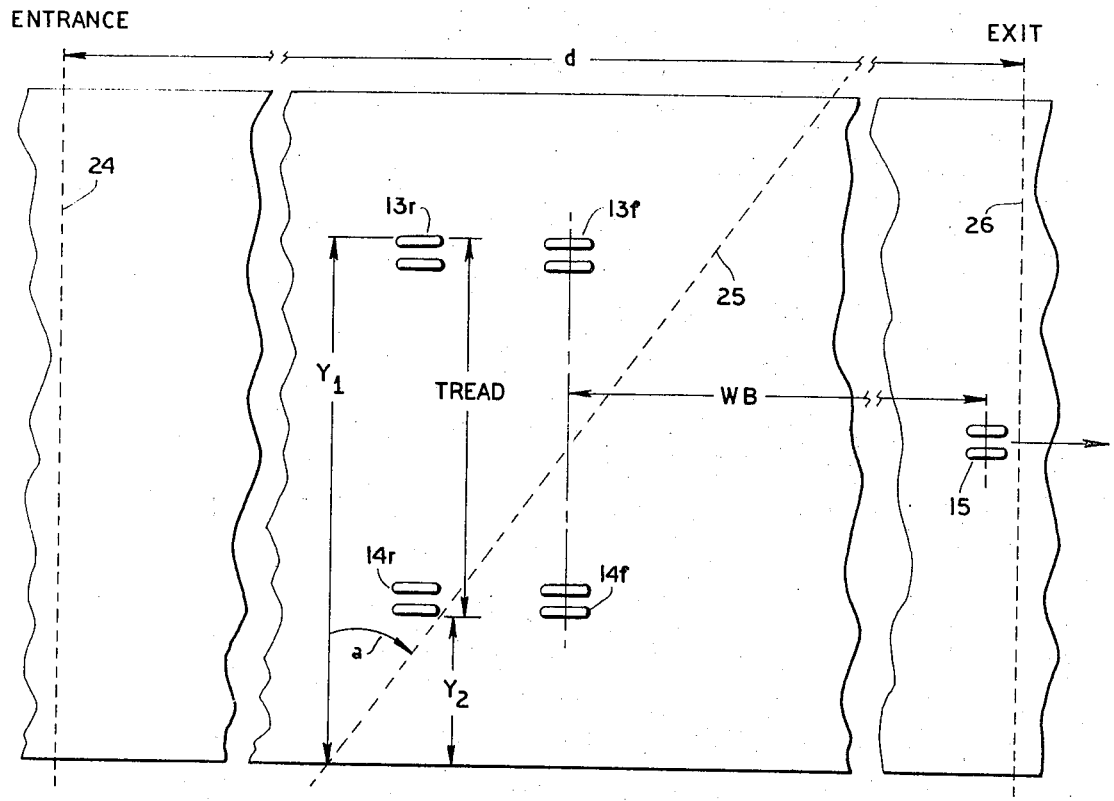
FIG. 3 shows a schematic plan view of a vehicle identification gate of the disclosed embodiment.

Stated in general terms, the present invention identifies vehicle types by identifying the "footprint" of the vehicle. The term "footprint" as used herein, refers to the number and relative positioning of the wheels or other structural members which support the vehicle. In the case of an aircraft, for example, virtually all contemporary aircraft utilize so-called tricycle landing gear having a nose wheel located at the nose or front end of the aircraft and aligned with the longitudinal axis of the aircraft, and additionally having at least a pair of "main landing gear" wheels positioned aft of the nose wheel and at equal distance spacing on either side of the longitudinal axis. Those skilled in the art will recognize the existence of footprints involving numerous variations of the basic tricycle landing gear configuration, typically but not necessarily including multiple "bogies," or separately mounted groups of wheels, as appropriate for the weight of the aircraft and the maximum desired specific loading which the runway surface is to withstand.

Stated more particularly, the footprint of the vehicle is determined according to the present invention by generating a unique relation of signals produced by and corresponding to the footprint of the particular vehicle. The signals are generated as the vehicle travels along a path which includes sensors positioned at signal generating locations, with at least one such sensor providing a signal each time a vehicle wheel passes the sensor irrespective to the lateral position of the wheel on the path of travel and with at least one other sensor generating a signal for each vehicle wheel at a time which is a function of the vehicular velocity and of the lateral position of each such wheel on the path of vehicle travel. The time relation of signals thus generated is used to determine the velocity of the vehicle and the dimensional locations of the wheels, from which the vehicle footprint is known. The dimensions determined from the measured signal velocity time relation produced by the wheels of a vehicle can be compared with predetermined dimension signals produced by the footprints of various known vehicle types, with a matching or best-fit comparison providing an identification of the vehicle type which produces the measured dimension signals.

The present invention is more particularly shown with respect to the disclosed embodiment employed to differentiate between and to identify various types of aircraft having landing gear configurations including the configuration shown by example in the diagrams of FIG. 1. FIG. 1(A) shows a basic tricycle landing gear having a single nose wheel 10 and a pair of dual main wheel assemblies 11 and 12. The spacing between the main wheel assemblies 11 and 12 is known as the "tread" of the landing gear, and the perpendicular spacing between the main wheel assemblies and the nose wheel is known as the "wheelbase." Examples of contemporary aircraft which have a landing gear configuration of the type shown in FIG. 1(A) are the DC-9 (Series 10 and Series 20). Although the landing gear of FIG. 1(A) shows a nose wheel 10 consisting of a single wheel, a variation of this gear configuration utilizes a dual-wheel nose wheel. This variation is found on aircraft types such as the Boeing 727-100, 727-200, and the Boeing 737-100 and 737-200. It will be understood by those skilled in the art that the tread and wheelbase is different for the aforementioned basic tricycle landing gear as used on these and other particular types of aircraft.

FIG. 1(B) shows a tricycle landing gear having tandem dual main gear assemblies 13 and 14, along with a dual nose wheel 15. Landing gear of the type shown in FIG. 1(B) are used on aircraft such as the Boeing 707-120, the DC-10 (Series 10), the DC-8, the Lockheed L-1011, and others.

The landing gear configurations shown in FIG. 1(C) differs from that of 1(B) in the inclusion of a center main wheel assembly 16 interposed between the outboard main wheel assemblies 13 and 14. The landing gear configuration of FIG. 1(C) is found on contemporary aircraft such as the DC-10 (Series 20 and 30). FIG. 1(D) includes the nose wheel 15 and the main wheel assemblies 13 and 14 as in the landing gear of FIG. 1(B), and additionally includes two pairs of dual tandem main gear assemblies 17 and 18 positioned aft of the main gear assemblies 13 and 14 and laterally spaced from the longitudinal access of the aircraft. Landing gear as shown in FIG. 1(D) is currently used only on relatively heavy aircraft such as the Boeing 747, types B, C, and F.

It should be recognized that the preceding discussion of aircraft landing gear is by way of example only, and is not intended to be a complete description of all gear types. Those persons knowledgeable in the art will recognize that other types of aircraft not specifically identified herein have landing gear assemblies which fit within one of the aforementioned categories and will additionally recognize that other types of aircraft have landing gear assemblies which do not fall within any of these categories. It will become apparent from the following description, however, that the identification system of the present invention is operable with landing gear assemblies other than those specifically depicted in FIG. 1, and additionally is operable with automobiles and other vehicles having non-tricycle wheel arrangements.

Turning next to FIG. 2, there is shown a segment of a vehicle travel path such as the runway 23. The runway 23 is provided with a multiple-element vehicle detection gate 27 including an entrance gate 24, a diagonal gate 25, and an exit gate 26. The three gates are collectively identified hereinafter as an "N-gate" 27. The entrance gate 24 and the exit gate 26 each extends across the runway 23 in a direction substantially normal to the length of the runway 23, while the diagonal gate 25 extends at some predetermined diagonal angle $a$ with respect to the entrance and exit gates.

Each of the three individual gates making up the N-gate 27 can be any type of sensing device which produces a signal in response to the passage of a physical object, such as an element of an aircraft landing gear, when traversed by that object. By way of example, each of the three gates 24–26 may be provided by a beam of illumination projected by corresponding sources 24a, 25a, and 26a in the appropriate direction to impinge on corresponding illumination sensors 24b, 25b, and 26b. Each of the light sources preferably includes appropriate apparatus to chop or pulse the light beam at a known rate, and each of the sensors correspondingly is equipped to be sensitive only to illumination at the pulse rate, so that the N-gate will be insensitive to variations in ambient light level. Band-pass filtering of the outputs provided by the sensors will reject all inputs which are not pulsed at the pulse rate provided by the illumination sources. Each of the corresponding illumination sources and sensors are preferably positioned to provide an illumination beam which crosses the runway 23 as closely as practical to the runway surface, inasmuch as the beams must be interrupted by passage of the landing gear elements.

Although the disclosed embodiment of the present invention utilizes optical beams to detect the passage of a vehicle, it will be understood that any alternative detection apparatus can be used which produces a signal in response to the passage of a vehicle wheel. By way of example, pressure-sensitive tapes are known which may be disposed on the surface of a roadway and which produce an electrical signal in response to the weight of a vehicle wheel passing thereover. Such tapes and other devices which require a physical presence on the runway surface have obvious disadvantages, however, since such devices are continually subject to damage resulting from passage of vehicle wheels and from snowplows and other objects. As a further alternative, the use of inductive detection wires buried beneath the surface of the runway may be considered.

Figure 4:
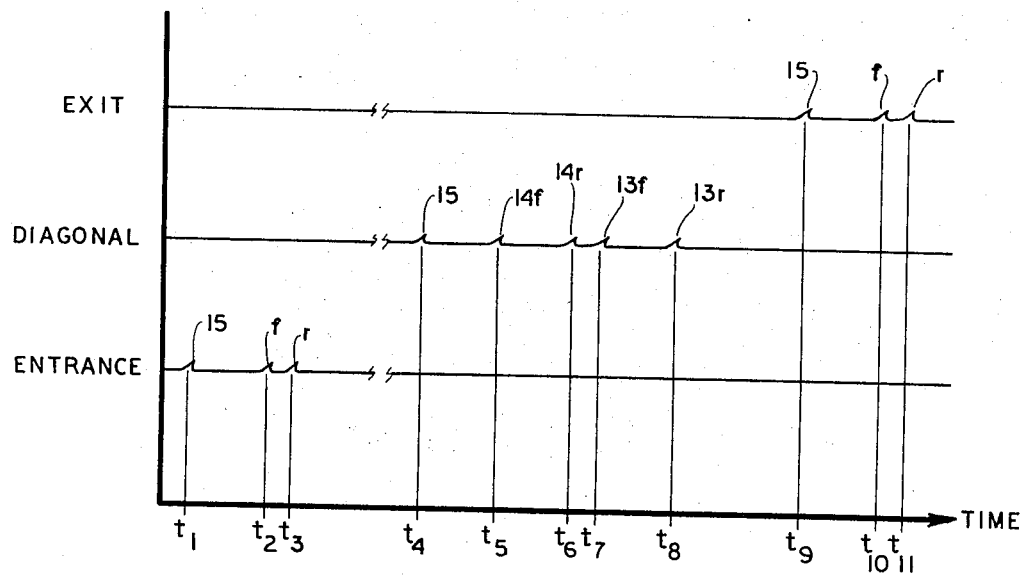
FIG. 4 shows an example of timing signal data provided by the vehicle identification gate of FIG. 3.

The manner and the sequence in which the signals are generated by the N-gate 27 in response to the passage of a vehicle are made clear by reference to the timing signals of FIG. 4, wherein it is assumed for the purpose of the present illustrative embodiment that an aircraft having landing gear of the type shown in FIG. 1(B) is moving through the N-gate in the direction shown in FIG. 3 by the arrow associated with the nose wheel 15. The landing gear thus consists of a nose wheel 15, a right-side pair of front main landing gear wheels 14f and rear main landing gear wheels 14r, and a left-side corresponding pair of main landing gear wheels 13f and 13r. It should be understood that the relative positioning of the landing gear wheels as depicted in FIG. 3 is not intended to represent an actual scale depiction of such wheels.

Each detected crossing of the entrance gate 24, the diagonal gate 25, and the exit gate 26 is indicated on the corresponding time line of FIG. 4 by a signal identified with a number corresponding to the particular wheel producing the signal. Referring first to the entrance gate 24, it will be understood that passage of the nose wheel 15 past the entrance gate 24 generates a first signal 15, and that the subsequent passage of the front main gear wheels 13f, 14f, produces a single signal $f$ on the entrance gate timeline of FIG. 4. The front main gear signal $f$ is soon followed by the signal $r$ generated by passage of the rear main gear wheels 13$r$, 14$r$. With reference to the exit timeline of FIG. 4, it will be understood that the sequence of signals previously occurring on the entrance gate timeline is repeated in delayed occurrence as the landing gear subsequently passes through the exit gate 26.

Although neither the entrance gate 24 nor the exit gate 26 can differentiate between the left and right wheels of either the front main gear or the rear main gear, such differentiation is possible with the diagonal gate 25. With the particular angular orientation $a$ of the diagonal gate 25 as shown in the disclosed embodiment, it can be seen that this gate is traversed by the right front main wheel 14$f$ followed by the right rear main wheel 14$r$. The signals produced by traversal of the diagonal gate 25 by the entire right-side main landing gear are thus distinguishable in time of occurrence relative to the subsequently-generated signals produced by the front and rear elements of the left main landing gear, and so the identity of the corresponding signals depicted on the diagonal timeline of FIG. 4 is known without actually observing the passage of the aircraft through the N-gate. Of course, this knowledge is based on the assumption that the geometry of the N-gate is chosen such that the diagonal gate 25 is always crossed by the same sequence of landing gear wheels.

All information necessary to identify the configuration of the aircraft landing gear can be determined from the time information obtained by the passage of the aircraft through the N-gate. For example, the average velocity of the aircraft can be determined by the equation:

$$V = d/(t_9 - t_1) \quad (1)$$

Where $V$ equals the average velocity, and $d$ equals the distance between the entrance gate 24 and the exit gate 26.

Since the average velocity of the aircraft is now known, and since the time required for each element of the landing gear to travel from the entrance gate 24 to the diagonal gate 25 is known, the lateral spacing between each such landing gear element and an imaginary line drawn perpendicular to the entrance and exit gates can be computed. Thus, assuming $Y_1$ to be the lateral distance of the left rear main wheel 13$r$ and $Y_2$ to be the lateral spacing of the right rear main wheel assembly 14$r$, then the tread $T$ of the main landing gear can be shown to be:

$$T = Y_2 - Y_1 = [V(t_8 - t_6)/\tan(a)] \quad (2)$$

where $a$ is the angle between the diagonal gate 25 and the entrance gate 24.

Similarly, the wheelbase ($WB$) of the aircraft is given by the following equation:

$$WB = V(t_{10} - t_9) \quad (3)$$

where the wheelbase ($WB$) is defined as the longitudinal distance between the nose wheel 15 and the front main landing gear wheels 13$f$, 14$f$.

Returning to FIG. 2, apparatus is depicted in general schematic form for providing the preceding computations. The outputs of each sensor 24$b$, 25$b$, and 26$b$ are connected to respective coincidence gates 31, 32, 33, each of which is additionally connected to receive pulses from a source 34 of clock pulses. Each of the coincidence gates 31-33 is connected to provide an output signal when the sensor associated with that gate has an output indicating the interruption of the particular illumination being normally received by such sensor. It will be understood by those skilled in the art that the output of each coincidence gate is normally at a given logic condition while the illumination beam (or other sensing device) remains uninterrupted, and this output is momentarily changed to another logic state in response to such an interruption.

The output of the coincidence gates 31 and 33 are connected to the difference circuit 35 which operates to provide a signal corresponding to the time differential necessary for computing average velocity according to the above equation (1). This differential time signal is supplied to the velocity computation circuit 36, which operates to solve said equation (1) and to provide an output signal corresponding to the average velocity of a vehicle passing through the N-gate 27. This output velocity signal can be supplied to a suitable display (not shown), if desired.

The output from the coincidence gate 32, provided by the wheel crossings of the diagonal gate 25, is supplied to another difference circuit 37, which operates to provide the differential time signal required for computing a particular lateral distance [for example, the differential time ($t_8 - t_6$) required in equation (2)], and this differential time signal is supplied to a computation circuit 38 which performs the computation required to solve equation (2). It will be understood by those skilled in the art that the computation circuit 38 is fixedly provided with an input signal corresponding to the tangent of the particular angle $a$ for the geometry of a given N-gate, and that this angle remains unchanged for a particular gate.

Similar circuitry for determining the vehicle wheelbase according to equation (3) includes a difference circuit 40 which operates to provide the differential time signal [($t_{10} - t_9$), for example] necessary to perform the arithmetic computation of equation (3). This differential time signal is supplied to a computation circuit 41 which performs the computation necessary to provide a wheelbase signal according to equation (3).

The various circuits of FIG. 2 are shown as operating in response to a central control circuit 39 inasmuch as it will be apparent from the previous discussion relevant to FIG. 3 and to the timelines of FIG. 4 that certain specific time signals, corresponding to the desired elapsed times necessary for the computation of velocity and the subsequent computation of vehicle footprint dimension in the foregoing equations, must be selected. Thus, it is seen that computation of the tread distance requires selection of the third and the fifth signals (i.e., $t_6$ and $t_8$) in the sequence of signals generated by the diagonal gate 25. The counting circuitry necessary to accomplish this selection of timing signals is conventional and need not be described herein.

After obtaining signals corresponding to the tread and the wheelbase, as well as any other dimensions of landing gear geometry which are desired to be computed from the velocity and timing information produced by passage of a vehicle through the N-gate, these dimension signals can be compared with signals of corresponding dimensions for landing gear of known types of aircarft. Correspondence of the measured dimensions with the known dimensions indicates that the aircraft or other vehicle which produced the measured information has a landing gear configuration identical to that of the particular known vehicle. This comparison of dimension signals is diagrammatically shown in FIG. 2, wherein signals of computed tread and wheelbase are supplied to a comparator 44. The comparator 44 also is supplied from 43 with stored data signals corresponding to known tread and wheelbase data which would be computed in response to various types of known vehicles passing through an N-gate consisting of the aforementioned three individual gates. The measured data and the stored data are compared in the comparator 44 by bestfit techniques or in other ways known to those skilled in the art, and an identity of measured data with stored data provides a vehicle-type output corresponding to the identity of the vehicle-type associated with the stored data which corresponds with the measured data. It will be apparent to those skilled in the art that the comparator can be programmed to provide a no-fit indication in the case of measured data produced by passage of a vehicle for which there is no stored dimension data.

In an actual embodiment of apparatus constructed according to the present invention, the control function as well as the various arithmetic computational functions are performed by a suitably programmed general-purpose digital computer and the display of computed information such as velocity, wheelbase, and the like is provided in printed form by Teletype output driven from the computer. A mini-computer manufactured by the Lockheed Electronics Company and sold under the designation "MAC-16" was used in the aforementioned actual working embodiment. Programming of this computer is known to those skilled in the art.

Furthermore, it is apparent that passage of a different configuration of landing gear through the N-gate may generate different signal arrangements. Accordingly, it is important to choose the angle $a$ such that a predetermined sequence of events (e.g., passage of right-side wheels before passage of left-side wheels, consistently occurs).

The above equations used to determine various dimensions according to the present invention can be modified to utilize other portions of the timing data produced by vehicle passage through the N-gate. For example, the average tread of the main landing gear of FIG. 3 can be determined by:

$$T = V(t_8 - t_6 + t_7 - t_5)/2 \quad (4)$$

which provides an averaged tread distance for the front and rear main wheels. Similarly, an average value or wheelbase can be determined by:

$$WB = V(t_{10} - t_9 + t_2 - t_1)/2 \quad (5)$$

It will be apparent that the foregoing relates only to a preferred embodiment of the present invention and that numerous alterations and modifications may be made therein without departing from the spirit and the scope of the invention as set forth in the following claims.

What is claimed is:

1. Apparatus for determining the position of a vehicle as the vehicle moves along a path, comprising:
   first means positioned with respect to the path for providing a first signal corresponding to the time required for the vehicle to move a predetermined distance along the path;
   second means positioned with respect to the path to provide a second signal corresponding to the time required to travel between a first location normal to the direction of travel on the path and an intersection of a second location diagonal to the path; and
   computing means connected to receive said first signal and said second signal and operative to provide a third signal as a function of the ratio which the second signal bears to the first signal, and which is thus a function of the lateral position of the intersection of the second location.

2. Apparatus as in claim 1, wherein said second means comprises a first control device positioned normal to the direction of movement along the path to provide a first control signal in response to the passage of a vehicle, and a second control device positioned across and at a certain angle diagonal to said direction of movement to provide a second control signal in response to the passage of a vehicle.

3. Apparatus as in claim 2, wherein said computing means includes clock means, and circuit means responsive to said first and second control signals to provide said second signal as the amount of clock time occurring between the occurrence of said first and second control signals.

4. Apparatus for obtaining data indicating the identity of a vehicle traveling along a path by detecting the passage of vehicle wheels, comprising:
   first sensing means positioned across the path and substantially perpendicular to the nominal length of the travel path to provide a first signal in response to the passage of a vehicle wheel along the path;
   second sensing means positioned across the path a spaced distance apart from said first sensing means as measured along the nominal length of the path and operative to provide a second signal in response to the passage of a vehicle wheel along the path;
   said second sensing means positioned across the path at an oblique angle with respect to the nominal length to cause all vehicle wheels of a first wheel set to pass the second vehicle means before any wheel of a second wheel set crosses the second sensing means.

5. Apparatus as in claim 4, wherein said second sensing means is positioned at an oblique angle at least large enough to permit all wheels at a particular location on one side of the vehicle to pass the second sensing means before any wheel at the same particular location on the opposite side of the vehicle passes the second sensing means.

6. The method of evaluating the wheel pattern of a vehicle, comprising the steps of:
   generating a first signal which is a function of the time required for the vehicle to move along a path of known distance;

generating a second signal which is a function of the time required for a vehicle support member to move between a location substantially normal to the path and a location determined by the lateral position of the support member on the path; and generating a third signal which is a function of said first and second signals and which is proportional to said lateral position of the support member.

7. The method of claim 6, further comprising:

generating a fourth signal which is a function of the time required for a second support member of the vehicle to move between said substantially normal location and a location determined by the lateral position of the second support member on the path; and generating a fifth signal which is a function of said first and fourth signals and which is proportional to said lateral position of the second support member.

8. The method of claim 7, comprising the additional step of generating a sixth signal which is a function of the difference between said fifth signal and said third signal, and which accordingly is a function of the lateral distance between said two support members.

9. The method of claim 7, wherein each of said third and fifth signals is generated as a function of the equation:

$$L = (V)(T_L)/\tan a$$

where $L$ is the lateral position of the support member, $V$ is the velocity of the vehicle, $T_L$ is the determined time for the support member to travel between said substantially normal location and the lateral position of the support member, and $a$ is the included angle between the substantially normal location and a line which intersects the said lateral positions.

10. The method of claim 8, further comprising comparing said sixth signal with a plurality of reference signals corresponding to known lateral distances between support members of certain known vehicles; and generating an output signal indicating the reference signal which most closely is identical with said sixth signal.

11. Apparatus as in claim 1, wherein:

said second means is responsive to the time required for a certain support member of the vehicle to travel between said first location and said diagonal intersection.

12. Apparatus as in claim 11, wherein:

said first means is responsive to the time required for a vehicle support member to move said predetermined distance.

13. Apparatus as in claim 1, further comprising:

signal storage means operative to receive and store a predetermined third signal condition corresponding to the movement of at least one known type of vehicle along said path; and signal comparison means operative to compare said third signal generated by said computing means with said predetermined third signal conditions stored in said storage means and operative to provide a vehicle type output signal indicative of a said known vehicle type in response to said generated third signal having a predetermined comparison correspondence with a said predetermined signal condition.

14. Apparatus as in claim 4, further comprising:

signal storage means operative to receive and store predetermined signal conditions which are a function of the passage of said vehicle wheels of certain known types of vehicles along said path; and signal comparison means operative to compare the same function of said second signals provided by said second sensing means with said predetermined signal conditions stored in said storage means and operative to provide a vehicle type output indicative of a said known vehicle type in response to said function of said second signal having a predetermined comparison correspondence with a said predetermined signal condition.

* * * * *